United States Patent [19]

Terashita

[11] Patent Number: 5,798,511
[45] Date of Patent: Aug. 25, 1998

[54] PHOTOGRAPHIC PRINTER AND PRINTING METHOD

[75] Inventor: Takaaki Terashita, Kanagawa, Japan

[73] Assignee: Fuji Photo Film Co. Ltd., Kanagawa, Japan

[21] Appl. No.: 686,533

[22] Filed: Jul. 26, 1996

[30] Foreign Application Priority Data

Jul. 28, 1995 [JP] Japan .................................. 7-193727

[51] Int. Cl.$^6$ .................................................. G05K 7/10
[52] U.S. Cl. ............................ 235/462; 235/436; 235/432
[58] Field of Search .................................. 235/375, 432, 235/492, 436; 355/38, 77, 68

[56] References Cited

U.S. PATENT DOCUMENTS

| | | | |
|---|---|---|---|
| 3,731,874 | 5/1973 | Fowlie | 235/432 |
| 3,737,224 | 6/1973 | Culler | 235/432 |
| 4,251,156 | 2/1981 | Zimmermann et al. | 355/41 |
| 4,827,109 | 5/1989 | Matsumoto et al. | 235/375 |
| 4,970,542 | 11/1990 | Tokuda | 355/38 |
| 5,028,950 | 7/1991 | Fritsch | 355/22 |
| 5,467,168 | 11/1995 | Kinjo et al. | 355/77 |
| 5,563,984 | 10/1996 | Tanibata | 395/105 |

FOREIGN PATENT DOCUMENTS

| | | | |
|---|---|---|---|
| 4-157439 | 5/1992 | Japan | G03B 27/72 |
| 5-2227 | 1/1993 | Japan | G03B 27/73 |

Primary Examiner—Donald T. Hajec
Assistant Examiner—Thien Minh Le
Attorney, Agent, or Firm—Sughrue, Mion, Zinn, Macpeak & Seas, PLLC

[57] ABSTRACT

A photographic printer effects a second printing operation for one original frame (60) on a developed photo film (10), after a first printing operation is effected. First correcting information is used in the first printing operation for correcting an exposure amount of the original frame. To produce a photographic print, first and second equipment information is predetermined, which is associated respectively with the first and second printing operations. The first and second equipment information represents an ID of each photographic printer for effecting the first and second printing operation, or represents an ID of a printer group to which each printer belongs. The first correcting information of the original frame and the first equipment information is written to a magnetic recording layer (10c) in the first printing operation. The magnetic recording layer is formed on the photo film. The first correcting information of the original frame and the first equipment information is read from the magnetic recording layer before the second printing operation. It is determined whether the first equipment information coincides with the second equipment information. If the first equipment information coincides with the second equipment information, then the second printing operation of the original frame is effected by use of the first correcting information.

26 Claims, 4 Drawing Sheets

PHOTOGRAPHIC PRINTER AND PRINTING METHOD

BACKGROUND OF THE INVENTION

1. Field of the Invention

The present invention relates to a photographic printer and printing method. More particularly, the present invention relates to a photographic printer and printing method in which a photographic print produced in extra printing operation can have high quality similar to one produced in initial printing operation.

2. Description Related to the Prior Art

It is generally observed that, in a photographic printer, a photographic print produced from developed photo film in extra printing operation inevitably has different quality from one produced in initial printing operation even from the same frame of photo film. There are various suggestions for solving this problem: JP-A 4-157439 discloses a technique in which photo film type information and frame information, which is obtained by subjecting a frame on the photo film to photometry, is written to a recording medium, and in which the information is read before the extra printing, to determine an exposure amount. U.S. Pat. No. 4,827,109 (corresponding to JP-A 63-201645) discloses a technique in which an exposing condition is written to a memory card, and read therefrom in relation to the frame as designated for the extra printing. JP-A 5-2227 discloses a photographic printer in which a correcting amount is calculated by an image information processor from the exposure amount. The correcting amount is converted to correcting information by a correcting information input device of the photographic printer, and is written to the recording medium magnetically or to a surface of a photographic print. However there is no prior document suggesting operation of a second photographic printer for the extra printing. An inevitable difference between a photographic print produced in second printer from one produced in the first or initial printer cannot be reduced and canceled.

The exposing condition to be used in the extra printing can be stored in the photo film or the recording medium, and can be effectively used in the photographic printer being identical at the time of the extra printing. However it is impossible to finish an extra photographic print as agreeably as the initially produced photographic print, when the extra printing is effected by a different or second photographic printer, and in use of the exposing condition as stored.

It is also known in the art that an image of the frame is subjected to photometry before the printing, automatically corrected according to the photometric result, and simulated on a CRT as a monitor, to input the correcting amount manually while the simulated image is observed. This technique cannot solve the problem of the inevitable difference between the initial printing and the extra printing, as the correcting amount manually input at the time of the initial printing becomes unusable after the end of the initial printing, even when the photographic printer being identical is used for two times.

SUMMARY OF THE INVENTION

In view of the foregoing problems, an object of the present invention is to provide a photographic printer and printing method in which a photographic print produced in extra printing operation can have high quality similar to one produced in initial printing operation.

In order to achieve the above and other objects and advantages of this invention, a second printing operation is effected for one original frame on a developed photo film after effecting a first printing operation. First correcting information is used in the first printing operation for correcting an exposure amount of the original frame. To produce a photographic print, first and second equipment information is predetermined, which is associated respectively with the first and second printing operations. The first and second equipment information represents an ID of each photographic printer for effecting the first and second printing operation, or represents an ID of a printer group to which each photographic printer belongs. The first correcting information of the original frame and the first equipment information is written to information recording medium in the first printing operation, the recording medium being combined with the photo film. The first correcting information of the original frame and the first equipment information is read from the recording medium before the second printing operation. It is determined whether the first equipment information coincides with the second equipment information. If the first equipment information coincides with the second equipment information, then the second printing operation of the original frame is effected by use of the first correcting information.

If the first equipment information is different from the second equipment information, second correcting information is determined for correcting an exposure amount of the original frame. The second printing operation is effected by use of the second correcting information.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
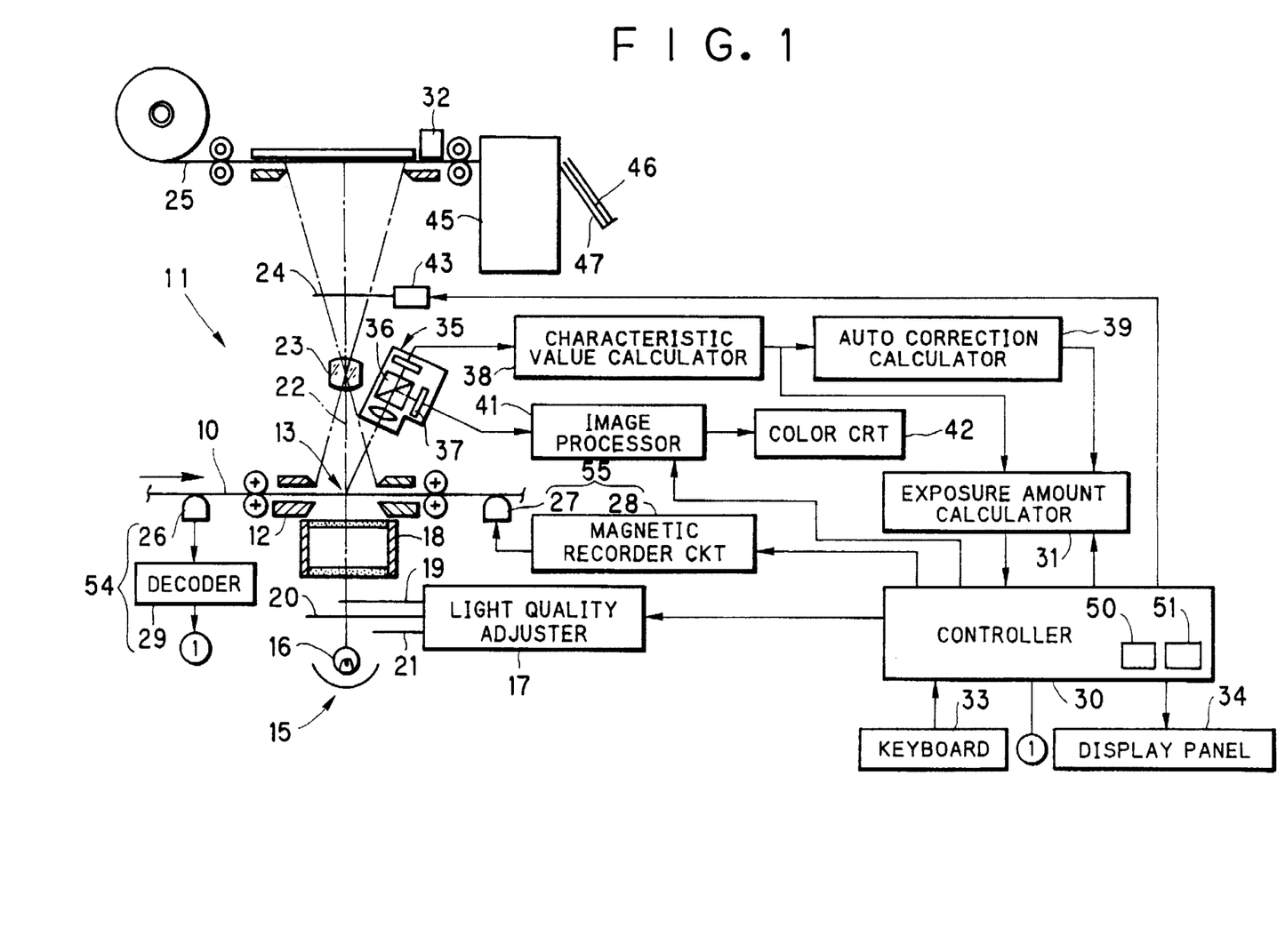
FIG. 1 is a schematic diagram illustrating a photographic printer of the present invention.
Figure 3:
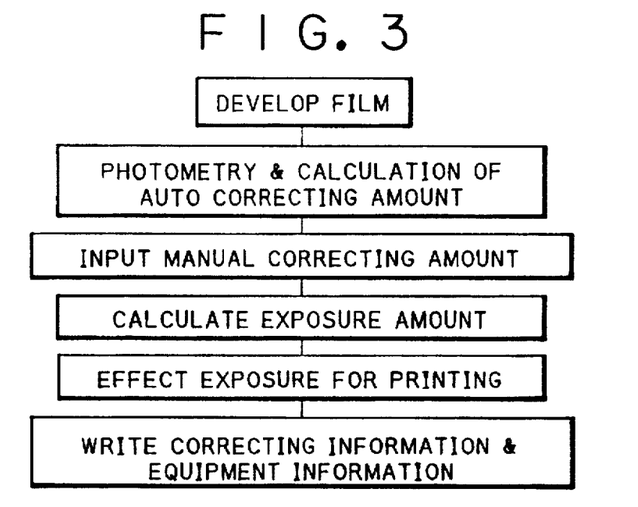
FIG. 3 is a flow chart illustrating operation of initial printing.

FIG. 1 illustrates an overall arrangement of a printer/processor 11, which is operated in an initial step of a flow of FIG. 3. The flow indicates steps where exposed photo film is handled in a photo laboratory. The photo film has a magnetic recording layer, which can record photo film information, exposure-taking information and printing information.

The printer/processor 11 consists of a combination of a photographic printer section and a paper processor section. In FIG. 1, developed photo film 10 is set in a photo film holder 12 of the printer/processor 11. The photo film holder 12 moves the photo film 10 by one frame, to set each frame in a printing station 13. There is a light source 15 disposed under the photo film holder 12. The light source 15 includes a lamp 16, a light quality adjuster 17 and a diffuser box 18 known in the art. The light quality adjuster 17 inserts cyan, magenta and yellow filters 19, 20 and 21 into a printing light path 22 by a predetermined amount, to adjust quality of printing light. Above the photo film holder 12 are disposed a printing lens 23 and a black shutter 24, through which a designated frame 60 (See FIG. 1A) is printed to color paper 25 while the frame 60 is illuminated by the light source 15.

There is a magnetic playing head 26 disposed upstream from the printing station 13 on the photo film holder 12. A magnetic recording head 27 is disposed downstream from the printing station 13. The magnetic recording head 27 is driven by a magnetic recorder circuit 28, and writes equipment information and correcting information to a magnetic recording layer 10c of the photo film 10 in FIG. 1B. Reference numeral 10a designates a photo film support, 10b an emulsion layer, and 62 a magnetic recording area in FIG. 1A. The magnetic playing head 26 reads photo film information and exposure information from the photo film 10, to which they have written. A magnetic signal from the magnetic playing head 26 is converted by a decoder 29 into a form usable in the printer/processor, and sent to a controller 30. The controller 30, in response to the photo film information, changes data of coefficients of equations for a printing exposure amount, and sends the data to a printing exposure amount calculator 31. There is disposed a back date imprinter 32, which, in accordance with date information as included in the exposure information, imprints a date of taking the exposure to a back face of the color paper 25 inside an associated frame after printing. The controller 30 consists of a microcomputer known in the art, and effects sequential control of sections of the printer. There are a keyboard 33 and a display panel 34 connected to the controller 30. It is possible through the keyboard 33 to set or change one of various modes, and input a command.

A scanner 35 is disposed diagonally above the photo film holder 12. The scanner 35 includes a beam splitter 36, and consists of an image area sensor or light receiving section 37 for receiving light from the beam splitter 36. The scanner 35 measures light from respective points in the frame 60 in three-color separation. A characteristic value calculator 38, known in the art, receives a signal of a photometric result of the scanner 35, and determines plural kinds of characteristic values, which are sent to an auto correction calculator 39 and the printing exposure amount calculator 31. The auto correction calculator 39 designates a selected one of scene types in accordance with the plural kinds of the characteristic values, calculates an auto corrected amount according to the designating result, and sends the auto corrected amount to the printing exposure amount calculator 31. The printing exposure amount calculator 31, according to known equations for calculating exposure amounts, calculates a fundamental exposure amount in accordance with the information from the characteristic value calculator 38, for example the frame average density. The auto correcting amount from the auto correction calculator 39 is added to the fundamental exposure amount, to obtain the printing exposure amount.

Photometric data of the frame 60 to be printed is sent from the image area sensor or light receiving section 37 to an image processor 41, which converts the data into image data for simulating a finished image, which appears on a monitor CRT 42. A manual correcting amount, if desired when observing the simulated image, is input through the keyboard 33. The input correcting data is set in the printing exposure amount calculator 31, which adds it to a fundamental exposure amount, to obtain the printing exposure amount.

The printing exposure amount from the printing exposure amount calculator 31 is sent to the controller 30. The controller 30 determines set positions of the color filters 19–21 of the light quality adjuster 17 according to the printing exposure amount. Then the color filters 19–21 are set in the determined set positions. Afterwards the black shutter 24 is opened for a predetermined time by a shutter driver 43. An image of the frame 60 is printed at a suitable printing exposure amount. The color paper 25 and the photo film 10, after the printing, are fed as much as one frame.

The color paper 25 after the exposure is set into a paper processor 45 known in the art, developed, and then cut frame from frame, to obtain a photographic print 46. The photographic print 46 is exited to a receptacle tray 47.

When the photo film 10 is fed by one frame, the equipment information and the correcting information is magnetically written to the magnetic recording layer 10c of the photo film 10 by the magnetic recorder circuit 28 and the magnetic recording head 27. The correcting information consists of a used combination of the auto correcting amount and the manual correcting amount. If the photo film 10 has a general recording area formed thereon according to one recording system, the equipment information is written to the general recording area without using the magnetic recording area 62 individual between frames. After the photo film 10 is moved by one frame, the photographing information of the frame 60 is read by the magnetic playing head 26.

The photographic print 46 and the photo film 10 are returned to the customer. In a small-scale type of photo laboratory, the printing operation is effected for the single strip of the photo film 10 at one time of using the printer/processor 11. In a large-scale type of photo laboratory, a photo film splicer is used for connecting a number of photo film strips in a form of an elongated photo film, which is set in a photo film processor, a photo film analyzer and then an automatic printer. The photofinishing operation is effected at a great scale. In the printing operation, the correcting information used in the printing and the equipment information for specifying the printer is written to the magnetic recording layer 10c of the photo film 10 via the magnetic recorder circuit 28 and the magnetic recording head 27.

In the extra printing, the photographic print 46 is produced in a manner similar to the initial printing by use of the printer/processor and an automatic printer. To finish the photographic print 46 in the extra printing with as high a quality as in the initial printing, the controller 30 of the printer/processor 11 and of the automatic printer is provided with the construction of FIG. 3.

Figure 2:
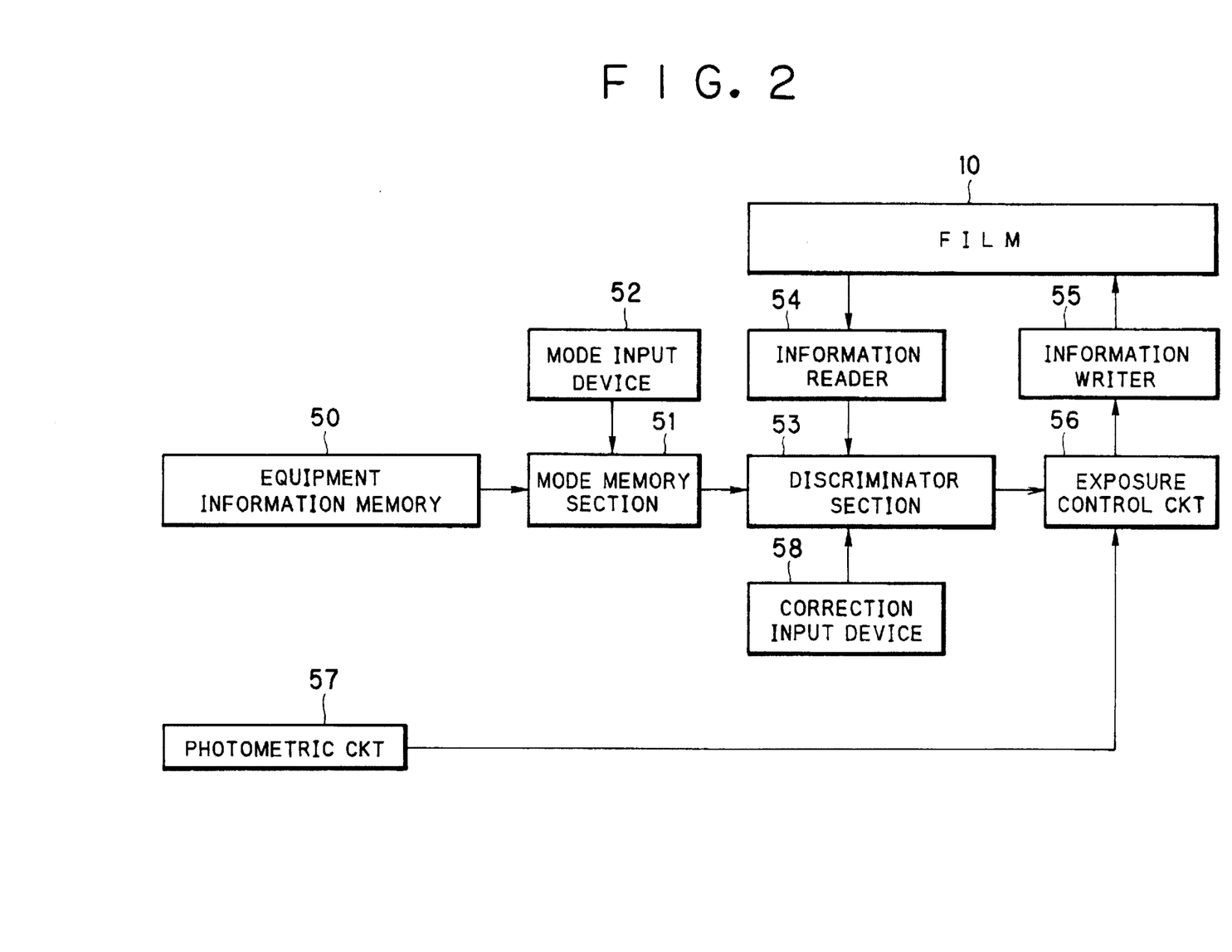
FIG. 2 is a block diagram illustrating a construction for detecting identity or similarity of the photographic printer, and with the photo film.

FIG. 2 schematically illustrates the construction of the printer. An equipment information memory 50 is included in the controller 30 of FIG. 1, and stores photo laboratory ID codes, printer type codes and printer ID codes. Each photo laboratory ID code is an encoded ID of a photo laboratory. Each printer type code is an encoded type of a photographic printer. Each printer ID code is an encoded ID of an individual photographic printer, which belongs to one of photo laboratories. The equipment information memory 50 also can store an encoded ID of a chain of photo laboratories, an encoded ID of a group of photo laboratories, an encoded ID of a manufacturer of photographic printers, an encoded ID of a predetermined group of types of photographic printers, and/or an encoded ID of a certain group of photographic printers.

A mode memory section 51 is also included in the controller 30, and stores modes (1)–(5) to designate kinds of the equipment information:

Mode (1): the correcting information is used if the photo laboratory where the correcting information has been input is identical;

Mode (2): the correcting information is used if the photo laboratory where the correcting information has been input is identical and the type of photographic printer having input the correcting information is common;

Mode (3): the correcting information is used if the photographic printer having input the correcting information is identical;

Mode (4): the correcting information is used if the type of photographic printer having input the correcting information is common;

Mode (5): the correcting information is not used, irrespective of the equipment information.

A mode input device 52 is constituted by the keyboard 33, the display panel 34 and part of the controller 30 in FIG. 1, and operated to setting a selected one of the modes (1)–(5), and also causes a discriminator section 53 to set the selected one mode.

An information reader 54 includes the magnetic playing head 26 and the decoder 29, and reads the equipment information and the correcting information from the magnetic recording layer 10c of the photo film 10. An information writer 55 includes the magnetic recording head 27 and the magnetic recorder circuit 28. If new correcting information is used in the extra printing, the information writer 55 overwrites the new correcting information to the magnetic recording layer 10c. To be precise, the initial information in the magnetic recording layer 10c is erased, and the new information is written instead to the magnetic recording layer 10c.

The equipment information being input, the discriminator section 53 discriminates the equipment information in accordance with the one mode as selected, to select one of two exposure controls. Namely, if the equipment information meets the one mode, then the correcting information is used by selecting the first exposure control. If the equipment information does not meet the one mode, then the correcting information is not used in the selection of the second exposure control. In using the correcting information according to the discrimination result, exposure information is added by an exposure control circuit 56 to the fundamental exposure amount obtained by the printer/processor 11, to determine a printing exposure amount, on the basis of which a photographic print is produced. The exposure control circuit 56 is constituted by the printing exposure amount calculator 31, the light quality adjuster 17 and part of the controller 30 in FIG. 1. The fundamental exposure amount is obtained from image information, for example the frame average density or large area transmittance density (LATD). If the equipment information does not meet the one mode, then the correcting information is not used even though the photo film 10 stores the correcting information. A photometric circuit 57 measures light from the frame 60 designated for the extra printing, to obtain photometric data, from which an automatic correction amount is calculated. The fundamental exposure amount is corrected according to the automatic correction amount, to print the frame 60. Note that the photometric circuit 57 is constituted by the scanner 35, the characteristic value calculator 38 and the auto correction calculator 39.

The correcting information mainly consists of an amount by which the fundamental exposure amount should be corrected, and comprises a printing density correcting amount and color correcting amounts. The correcting information of those kinds includes the auto correcting amount and the manual correcting amount. The auto correcting amount is obtained automatically by the photometric circuit 57 from the scanned data of the image. The manual correcting amount is manually input through a correction input device 58. The correction input device 58 is constituted by the keyboard 33, the display panel 34 and part of the controller 30. Correction keys in the keyboard 33 are depressed to input the manual correcting amount to the discriminator section 53. The manual correcting amount is represented by an integer value of steps of keys including the density correction key and the color correction keys. A unit change value of exposure is predetermined for each one key step of the integer. The correcting amount is the unit change value multiplied by the integer value of the key steps. In view of saving capacity of the memory, it is possible to add the manual correcting amount to the auto correcting amount, or to store the integer value.

Figure 4:
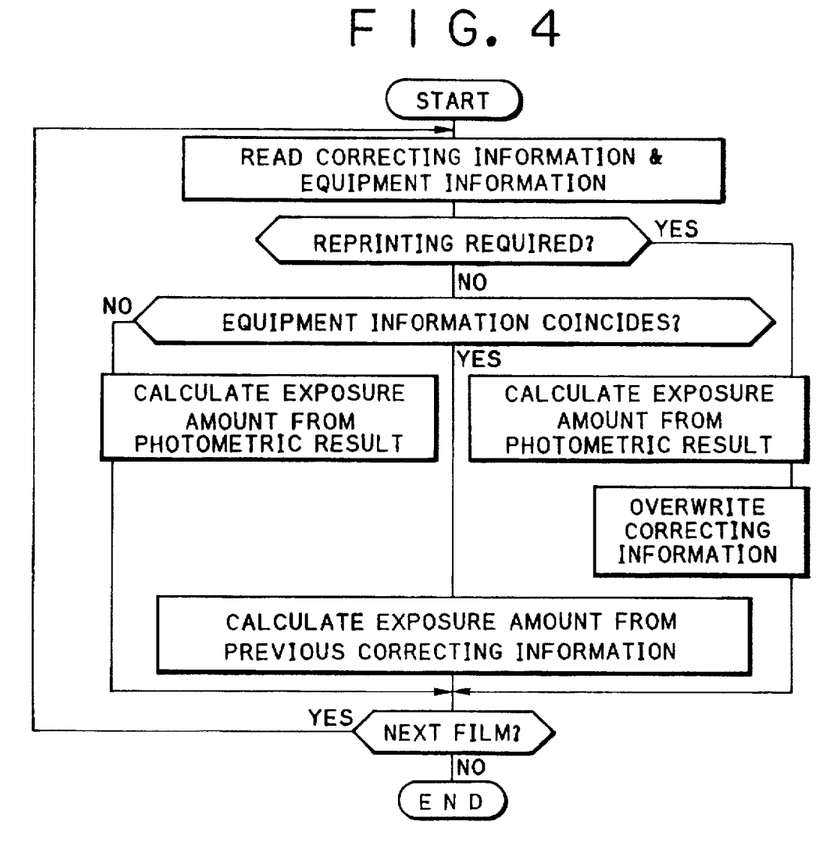
FIG. 4 is a flow chart illustrating process of extra printing.

A flow chart of FIG. 4 illustrates operation of the extra printing. A printer/processor in use is closely similar to the printer/processor 11 of FIG. 1. The photo film 10 is set in the photo film holder 12 designated in the extra printing. A frame number is input. Responsively the photo film starts being fed. Frame numbers stored in the magnetic recording layer 10c are read. Upon coincidence of the input frame number with a read one of the frame numbers, the feeding of the photo film 10 is stopped. The frame 60 is set automatically in the printing station 13.

In setting the frame 60 in the printing station 13, the equipment information and the correcting information stored in the magnetic recording layer 10c is read by the magnetic playing head 26. The equipment information being read is checked by the discriminator section 53 for coincidence with the equipment information of the present photographic printer, in accordance with the mode set through the mode memory section 51 and the mode input device 52. If the previous photographic printer or its group is detected to coincide with the present photographic printer or its group, then the correcting information stored by the photo film 10 is used in the printing operation. The photographic print 46 can be finished in the extra printing with as high a quality as in the initial printing.

Among the modes, the coinciding condition in the discrimination is broader in the order of the modes (3), (2), (1) and (4). According to the selection of the modes, a difference in the finished state between an extra print and the initial photographic print is changed. It is preferable that one of the modes is selected in consideration of meeting the tolerable range in the finished state. If the initially used photographic printer is different in the equipment information from the extra printing photographic printer presently in use, the correcting information as read is not used. Photometry is effected by the extra printing photographic graphic printer. The exposure correcting amount is calculated according to the photometric data, for the printing operation. The initial correcting information is not adaptable to the extra printing photographic printer, and not used again. The quality of an extra print can be high without being lowered.

In the reprinting operation, the auto correcting amount is calculated according to the photometric data obtained in the extra printing photographic printer, irrespective of the discrimination result. The printing exposure amount is determined for the printing operation. It is also possible to input a modifying amount for manually modifying the previous correcting information, and to subject the fundamental exposure amount, the previous correcting information and the present correcting amount to calculation, for determining the printing exposure amount, according to which a photographic print is produced.

To distinguish the extra printing and the reprinting, it is possible to input a distinction signal externally, or else to use the manually input correcting amount as distinction signal, in response to which the correcting information can be written again. If a printer of the present invention is structurally specialized for the extra printing, this does not require construction to distinguish the extra printing and the reprinting. Correcting information used in the reprinting operation is overwritten for the correcting information having been used in the previous printing. The overwritten written correcting information is used in the extra printing, so that an equal point can be produced with high quality equal to that of a reprinted photograph.

In the above embodiment, the mode input device 52 is adapted to entry of information of possibility or impossibility of using exposure amount information of a newly developed photographic printer in another photographic printer. However the present invention is applicable to a photographic printer without the mode input device 52.

It is also possible automatically to detect the initial printing and the extra printing in accordance with whether or not exposure amount information is stored on the photo film 10. If the exposure amount information is desired for the most precise use, it is preferable to preset a mode in which correcting information is used if the photographic printer having input the correcting information is identical and also the photo laboratory where the correcting information has been input is identical.

Figure 1A:
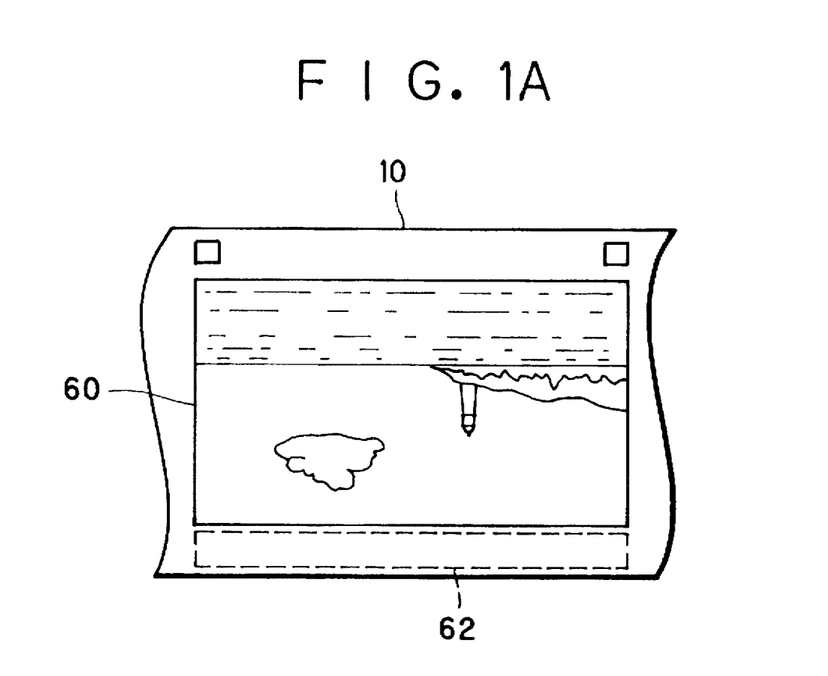
FIG. 1A is a plan illustrating an original frame on developed photo film.
Figure 1B:
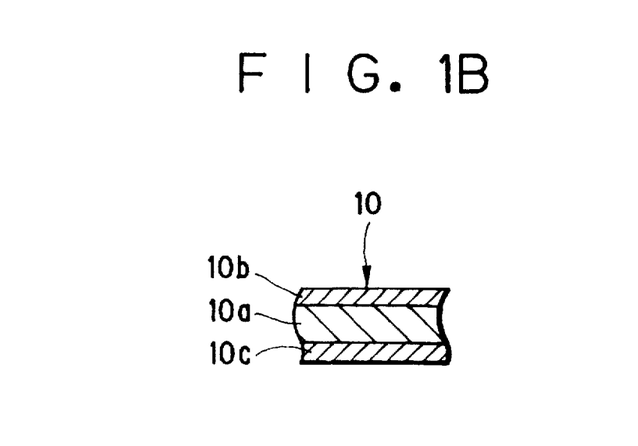
FIG. 1B is a cross section illustrating the photo film.

In the above embodiment, the equipment information and exposure information is written to the magnetic recording area 62 associated to the frame 60 on the photo film 10 one to one. It is also possible in the present invention to write the information to a recording area formed on a leader or a trailer of the photo film 10. Instead of the magnetic recording, the present invention is also applicable to the use of optical imprinting in a form of a bar code, or electronic writing to a memory, for the purpose of the information writing. To write the information, various recording media, such as a body of a photo film cassette, may be used instead of the magnetic recording layer 10c of the photo film 10.

In the above embodiment, the previously used correcting information is used in the presently used photographic printer only if the previously used photographic printer has the equipment information of the presently used photographic printer. Alternatively it is possible to convert the previous correcting information into a form adapted to the presently used photographic printer. The equipment information is for example the encoded type of photographic printer. Two or more types of photographic printers are previously stored. One or more converting tables for converting the correcting information are also stored. In accordance with the converting table, an automatic correction amount as correcting information of the previous photographic printer is converted to an automatic correction amount as correcting information of the present photographic printer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic printing method, in which a second printing operation is effected for one original frame on a developed photo film after effecting a first printing operation, first correcting information being used in said first printing operation for correcting an exposure amount of said original frame, said photographic printing method comprising steps of:

predetermining first and second equipment information associated respectively with said first and second printing operations, said first and second equipment information representing an ID of each photographic printer for effecting said first and second printing operation, or representing an ID of a printer group to which said each photographic printer belongs;

writing said first correcting information of said original frame and said first equipment information to information recording medium in said first printing operation, said recording medium being combined with said photo film;

reading said first correcting information of said original frame and said first equipment information from said recording medium before said second printing operation;

determining whether said first equipment information coincides with said second equipment information; and if said first equipment information coincides with said second equipment information, then effecting said second printing operation of said original frame by use of said first correcting information.

2. A photographic printing method as defined in claim 1, further comprising a step of, if said first equipment information is different from said second equipment information, determining second correcting information for correcting an exposure amount of said original frame, said second printing operation being effected by use of said second correcting information.

3. A photographic printing method as defined in claim 2, wherein said recording medium is a magnetic recording layer formed on said photo film.

4. A photographic printing method as defined in claim 2, further comprising a step of inputting a command of reprinting if said reprinting is desired for said second printing operation, said reprinting being effected to print said original frame without using said first correcting information.

5. A photographic printing method as defined in claim 4, further comprising steps of:

in response to said reprinting command, modifying said first correcting information into modified correcting information for said reprinting, said second printing operation being effected for said original frame by use of said modified correcting information; and overwriting said modified correcting information to said magnetic recording layer for said first correcting information.

6. A photographic printing method as defined in claim 5, wherein said ID of said printer group is associated with photographic printers belonging to one common photo laboratory.

7. A photographic printing method as defined in claim 5, wherein said ID of said printer group is associated with photographic printers of one common type.

8. A photographic printing method as defined in claim 5, wherein said ID of said printer group is associated with photographic printers which belong to one common photo laboratory and which are of one common type.

9. A photographic printing method as defined in claim 2, wherein said second equipment information respectively comprises a plurality of kinds of equipment information; further comprising steps of:

selectively setting one of a plurality of predetermined equipment information modes; and rendering effective at least one of said kinds of equipment information in association with said set one mode.

10. A photographic printing method as defined in claim 9, wherein said kinds of equipment information includes first, second and third kinds of equipment information;

said first kind of equipment information represents said printer ID;

said second kind of equipment information represents an ID of one photo laboratory, said printer group being constituted by a plurality of photographic printers belonging to said one photo laboratory; and said third kind of equipment information represents one printer type, said printer group being constituted by a plurality of photographic printers of said one printer type.

11. A photographic printing method as defined in claim 10, wherein said equipment information modes includes first, second, third and fourth modes, said first, second and third modes are associated respectively with said first, second and third kinds of equipment information, and said fourth mode is associated with a combination of said second and third kinds of equipment information.

12. A photographic printer, in which a second printing operation is effected for one original frame on a developed photo film after effecting a first printing operation, first correcting information being used in said first printing operation for correcting an exposure amount of said original frame, said first correcting information of said original frame and first equipment information being written to information recording medium in said first printing operation, said first equipment information being associated with said first printing operation, and representing a printer ID used for effecting said first printing operation, or representing an ID of a printer group used for effecting said first printing operation, said recording medium being combined with said photo film, said photographic printer comprising:

an information reader for reading said first correcting information of said original frame and said first equipment information from said recording medium before said second printing operation;

an equipment information memory for storing second equipment information, said second equipment information being associated with said second printing operation, and representing a printer ID used for effecting said second printing operation, or representing an ID of a printer group used for effecting said second printing operation;

a discriminator for determining whether said first equipment information coincides with said second equipment information; and a controller, responsive to a signal from said discriminator, and if said first equipment information coincides with said second equipment information, then said controller effecting said second printing operation of said original frame by use of said first correcting information.

13. A photographic printer as defined in claim 12, wherein said ID of said printer group is associated with photographic printers belonging to one common photo laboratory.

14. A photographic printer as defined in claim 12, wherein said ID of said printer group is associated with photographic printers of one common type.

15. A photographic printer as defined in claim 12, wherein said ID of said printer group is associated with photographic printers which belong to one common photo laboratory and which are of one common type.

16. A photographic printer as defined in claim 12, further comprising a correcting signal generator for generating a signal of second correcting information for correcting an exposure amount of said original frame;

if said first equipment information is different from said second equipment information, said controller effecting said second printing operation by use of said second correcting information.

17. A photographic printer as defined in claim 16, wherein said recording medium is a magnetic recording layer formed on said photo film.

18. A photographic printer as defined in claim 17, further comprising a reprinting command input device for inputting a command of reprinting if said reprinting is desired for said second printing operation;

said controller effecting said reprinting to print said original frame without using said first correcting information.

19. A photographic printer as defined in claim 18, wherein said controller, in response to said reprinting command, modifies said first correcting information into modified correcting information for said reprinting, and effects said second printing operation for said original frame by use of said modified correcting information; and further comprising an information writer, connected to said controller, for overwriting said modified correcting information to said magnetic recording layer for said first correcting information.

20. A photographic printer as defined in claim 19, wherein said correcting signal generator generates a signal of said first correcting information for correcting said exposure amount of said original frame;

said information writer is controlled by said controller in said first printing operation, and writes said first correcting information of said original frame and said first equipment information to said information recording medium.

21. A photographic printer as defined in claim 12, wherein said second equipment information respectively comprises a plurality of kinds of equipment information stored in said equipment information memory;

further comprising a mode selector, connected to said discriminator, for selectively setting one of a plurality of predetermined equipment information modes, to render effective at least one of said kinds of equipment information in association with said set one mode, for use in said discriminator.

22. A photographic printer as defined in claim 21, wherein said kinds of equipment information includes first, second and third kinds of equipment information;

said first kind of equipment information represents said printer ID;

said second kind of equipment information represents an ID of one photo laboratory, said printer group being constituted by a plurality of photographic printers belonging to said one photo laboratory; and said third kind of equipment information represents one printer type, said printer group being constituted by a plurality of photographic printers of said one printer type.

23. A photographic printer as defined in claim 22, wherein said equipment information modes includes first, second, third and fourth modes, said first, second and third modes are associated respectively with said first, second and third kinds of equipment information, and said fourth mode is associated with a combination of said second and third kinds of equipment information.

24. A photographic printer, in which a second printing operation is effected for one original frame on a developed photo film after effecting a first printing operation, first correcting information being used in said first printing operation for correcting an exposure amount of said original frame, said first correcting information of said original frame and first equipment information being written to information recording medium in said first printing operation, said first equipment information being associated with said first printing operation, and representing a printer ID used for effecting said first printing operation, or representing an ID of a printer group used for effecting said first printing operation, said recording medium being combined with said photo film, said photographic printer comprising:

- an information reader for reading said first correcting information of said original frame and said first equipment information from said recording medium before said second printing operation;
- an equipment information memory for storing second equipment information, said second equipment information being associated with said second printing operation, and representing a printer ID used for effecting said second printing operation, or representing an ID of a printer group used for effecting said second printing operation;
- a discriminator for determining whether said first equipment information coincides with said second equipment information;
- a reprinting command input device for inputting a command of reprinting if said reprinting is desired for said second printing operation; and
- a controller, responsive to a signal from said discriminator, and if said first equipment information coincides with said second equipment information, then said controller effecting said second printing operation of said original frame by use of said first correcting information, said controller effecting said reprinting to print said original frame without using said first correcting information.

25. A photographic printer as defined in claim 24, wherein said controller, in response to said reprinting command, modifies said first correcting information into modified correcting information for said reprinting, and effects said second printing operation for said original frame by use of said modified correcting information; and further comprising an information writer, connected to said controller, for overwriting said modified correcting information to said magnetic recording layer for said first correcting information.

26. A photographic printer as defined in claim 25, further comprising a correcting signal generator for generating a signal of said first correcting information for correcting said exposure amount of said original frame;

wherein said information writer is controlled by said controller in said first printing operation, and writes said first correcting information of said original frame and said first equipment information to said information recording medium.

* * * * *